United States Patent [19]
Whelan et al.

[11] Patent Number: 5,600,325
[45] Date of Patent: Feb. 4, 1997

[54] FERRO-ELECTRIC FREQUENCY SELECTIVE SURFACE RADOME

[75] Inventors: David A. Whelan, McLean, Va.; John Fraschilla, Redondo Beach; Brian M. Pierce, Moreno Valley, both of Calif.

[73] Assignee: Hughes Electronics, Los Angeles, Calif.

[21] Appl. No.: 473,821

[22] Filed: Jun. 7, 1995

[51] Int. Cl.$^6$ ............................... H01Q 1/42; G01S 7/28
[52] U.S. Cl. ........................... 342/13; 342/175; 343/909; 343/872
[58] Field of Search ........................... 342/1, 2, 3, 4, 342/5, 6, 13, 175; 343/909, 872

[56] References Cited

U.S. PATENT DOCUMENTS

| | | | |
|---|---|---|---|
| 5,103,241 | 4/1992 | Wu | 343/909 |
| 5,140,338 | 8/1992 | Schmier et al. | 343/909 |
| 5,208,603 | 5/1993 | Yee | 343/909 |
| 5,344,729 | 9/1994 | Akins et al. | 430/5 |
| 5,384,575 | 1/1995 | Wu | 342/909 |
| 5,400,043 | 3/1995 | Arceneaux et al. | 342/872 |
| 5,512,901 | 4/1996 | Chen et al. | 342/175 |
| 5,528,249 | 6/1996 | Gafford et al. | 342/704 |

*Primary Examiner*—John B. Sotomayor
*Attorney, Agent, or Firm*—Leonard A. Alkov; Wanda K. Denson-Low

[57] ABSTRACT

Ferro-electric frequency selective surface radomes that have dielectric layers that comprise voltage controlled material, and the electrical properties of the dielectric layers are voltage controlled. By varying the dielectric properties, the passband frequency of the radomes can be shifted to optimize frequency and angular response of the frequency selective surface. The radomes comprise grating screens having a plurality of printed radiating elements. Inner and outer voltage controlled dielectric layers are disposed on the grating screens. Relatively high ohms per square resistive films are disposed on exposed surfaces of the voltage controlled dielectric layers. In one embodiment, voltage control circuitry is coupled to the respective resistive films for controlling the voltages applied to the respective voltage controlled dielectric layers by actively varying the dielectric permittivity of the resistive films around a small percentage of its nominal value to provide a ground on outer surfaces of the dielectric layers. In another embodiment, the ferro-electric frequency selective surface radome may comprise voltage controlled dielectric layers disposed on one surface of the grating screens. Voltage control circuitry is coupled to the first and second grating screens for controlling the voltages applied thereto and thus the performance of the radome.

5 Claims, 1 Drawing Sheet

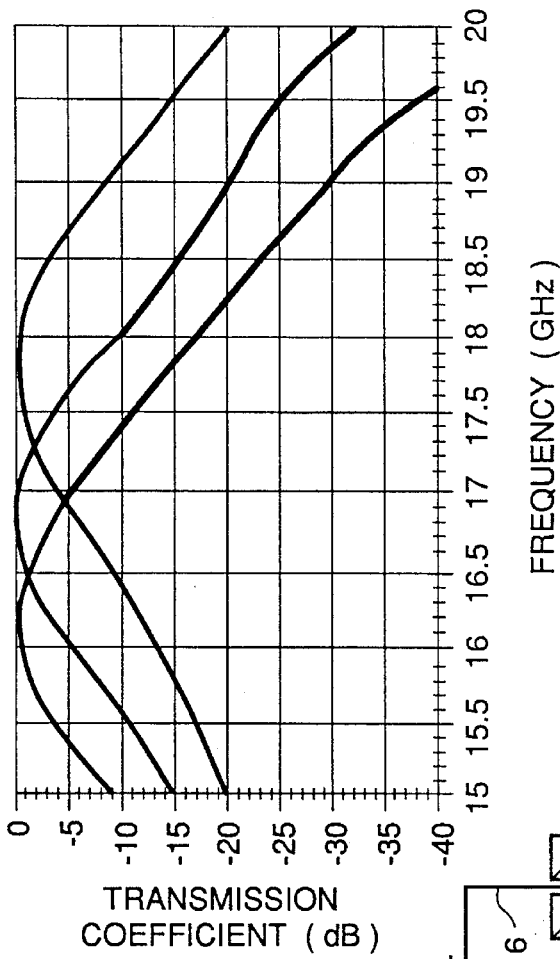
FIG. 2.
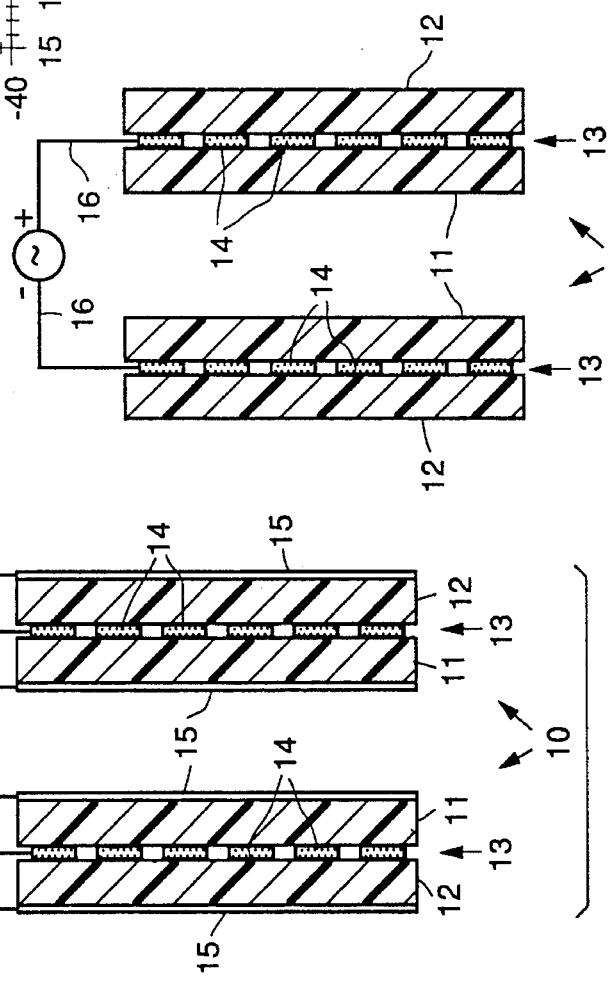
FIG. 3.
FIG. 1.

FERRO-ELECTRIC FREQUENCY SELECTIVE SURFACE RADOME

BACKGROUND

The present invention relates generally to radomes, and more particularly, to ferro-electric frequency selective surface (FFSS) radomes.

Conventional frequency selective surfaces (FSS) radomes are used in advanced low observability radar applications for fighter and reconnaissance aircraft, for example. Conventional frequency selective surfaces (FSS) are typically made of one or more grating screens sandwiched between two or more layers of constant dielectric material to form a radome. The radome transmission frequency and angular response of a typical conventional FSS are dependent on the grated screen geometry and dielectric layer material characteristics.

Therefore, it is an objective of the present invention to provide for ferro-electric frequency selective surface (FFSS) radomes.

SUMMARY OF THE INVENTION

In order to meet the above and other objectives, the present invention comprises ferro-electric frequency selective surface (FFSS) radomes. In one embodiment, the ferro-electric frequency selective surface radome 10 comprises a grating screen having first and second surfaces and comprising a plurality of printed radiating elements. Inner and outer voltage controlled dielectric layers are disposed on the first and second surfaces of the grating screen. Relatively high ohms per square resistive films are disposed on exposed surfaces of the inner and outer voltage controlled dielectric layers. Voltage control means am coupled to the respective resistive films for controlling the voltages applied to the respective inner and outer voltage controlled dielectric layers by actively varying the dielectric permittivity of the resistive films around a small percentage of its nominal value to provide a ground on outer surfaces of the dielectric layers.

In a second embodiment, the ferro-electric frequency selective surface radome 10 comprises first and second grating screens having first and second surfaces and comprising a plurality of printed radiating elements. Inner voltage controlled dielectric layers are disposed on the first surface of the respective grating screens. Outer dielectric layers are disposed on the respective second surfaces of the respective grating screens. Voltage control means are respectively coupled to the first and second grating screens for controlling the voltages applied thereto.

The ferro-electric frequency selective surface is typically constructed in the same manner as conventional frequency selective surfaces, but the dielectric layers are comprised of a voltage controlled material, and the electrical properties of the dielectric layers are voltage controlled. By varying the dielectric properties, the passband frequency can be shifted to optimize frequency and angular response of the frequency selective surface. The design of the ferro-electric frequency selective surface radome allows the dielectric material characteristics to be actively switched to optimize performance of the radome. The ferro-electric frequency selective surface radome permits active tuning of the frequency and angular characteristics of the frequency selective surface. This produces a wider range of optimum performance for radome transmission characteristics. The ferro-electric frequency selective surface radome design improves overall radar performance compared with the conventional frequency selective surface.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 shows a cross sectional view of a first embodiment of a ferro-electric frequency selective surface radome in accordance with the principles of the present invention; and FIG. 2 shows characteristics of the ferro-electric frequency selective surface radome of FIG. 1; and FIG. 3 shows a cross sectional view of a second embodiment of a ferro-electric frequency selective surface radome in accordance with the principles of the present invention.

DETAILED DESCRIPTION

Referring to the drawing figures, FIG. 1 shows a cross sectional view of a first embodiment of a ferro-electric frequency selective surface radome 10 in accordance with the principles of the present invention. The ferro-electric frequency selective surface radome 10 comprises inner and outer voltage controlled dielectric layers 11, 12 that sandwich a grating or grating screen 13 comprising printed radiating elements 14 or apertures 14. Resistive films 15 are disposed on exposed surfaces of the inner and outer voltage controlled dielectric layers 11, 12. The resistive films 15 have resistance values on the order of from 1000–2000 ohms per square. A plurality of voltage controllers 16 are respectively coupled to the resistive films 15 on the surfaces of the dielectric layers 11, 12.

The inner and outer voltage controlled dielectric layers 11, 12 have their voltages controlled using the plurality of voltage controllers 16 by varying the voltage one can actively tune the dielectric permittivity of the material around a small percentage of its nominal value. In the configuration shown in FIG. 1, the high ohms per square resistive film 15 is used to achieve a ground on the outer surfaces of the dielectric layers 11, 12. By varying the permittivity of the inner and outer voltage controlled dielectric layers 11, 12 about ±10% from a nominal value of er=2.3, the center frequency of the pass band of the ferro-electric frequency selective surface radome 10 can be shifted by ±1GHz.

FIG. 2 shows results of a computer simulation for normal incidence performed on the ferro-electric frequency selective surface radome 10 of FIG. 1. The transmission performance of the ferro-electric frequency selective surface radome 10 and its two-way transmission loss are improved when compared to a conventional frequency selective surface radome, and as is evident from the results shown in FIG. 2.

In addition, the angular response of the ferro-electric frequency selective surface radome 10 may also be actively optimized. FIG. 3 shows a second embodiment of the ferro-electric frequency selective surface radome 10 in which only the inner dielectric layers 11 are biased. There are no resistive films 15 employed in the second embodiment. The inner dielectric layers are coupled to the screens and the outer dielectric layers are left floating. A voltage controller 16 is coupled to the respective inner dielectric layers 11 that is used to control the respective operating voltages thereof.

Voltage variable dielectric materials that may be adapted for use in the present invention are described in articles by Kenneth M. Johnson entitled "Variation of Dielectric Constant with Voltage in Ferroelectrics and its Application to Parametric Devices" in Journal of Applied Physics, Vol. 33, No. 9, pp. 2826–2831, September 1962, and Howard Diamond entitled "Variation of Permittivity with Electric Field in Peroskite-like Ferroelectrics" in Journal of Applied Physics, Vol. 32, No. 5, pp. 909–915, May 1961. A report for the U.S. Army Research Laboratory, by L. C. Sengupta, E. Ngo, S. Stowell, M. E. O'Day, and R. Lancto, entitled "Processing Packaging and Characterization of Electroceramic Materials for Phased Array Antennas". Report No. ARL-TR-448, May 1994, also presents practical applications for voltage variable dielectric materials.

The design principles of the ferro-electric frequency selective surface radome 10 may be used to improve all known FSS radome configurations, and thus it is not limited to the configurations disclosed herein. Furthermore the design principles of the ferro-electric frequency selective surface radome 10 are independent of the printed element or aperture used in the design of the grating screen.

Thus there has been described a new and improved ferro-electric frequency selective surface (FFSS) radomes. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A ferro-electric frequency selective surface radome comprising:

a grating screen having first and second surfaces and comprising a plurality of printed radiating elements;

inner and outer voltage controlled dielectric layers disposed on the first and second surfaces of the grating screen;

relatively high ohms per square resistive films disposed on exposed surfaces of the inner and outer voltage controlled dielectric layers; and voltage control means coupled to the respective resistive films for controlling the voltages applied to the respective inner and outer voltage controlled dielectric layers by actively varying the dielectric permittivity of the resistive films around a small percentage of its nominal value to provide a ground on outer surfaces of the dielectric layers.

2. The radome of claim 1 wherein the resistive films have resistance values of from 1000–2000 ohms per square.

3. The radome of claim 1 wherein the permittivity of the inner and outer voltage controlled dielectric layers is varied from a nominal value to cause the center frequency of a pass band of the ferro-electric frequency selective surface radome to be shifted.

4. The radome of claim 1 wherein the permittivity of the inner and outer voltage controlled dielectric layers is varied about ±10% from a nominal value of er=2.3, to cause the center frequency of a pass band of the ferro-electric frequency selective surface radome to be shifted by ±1 GHz.

5. A ferro-electric frequency selective surface radome comprising:

first and second grating screens having first and second surfaces and comprising a plurality of printed radiating elements;

inner voltage controlled dielectric layers disposed on the first surface of the respective grating screens;

outer dielectric layers disposed on the respective second surfaces of the respective grating screens; and voltage control means coupled to the first and second grating screens for controlling the voltages applied thereto.

* * * * *